(12) United States Patent
Grivna

(10) Patent No.: US 6,655,038 B1
(45) Date of Patent: Dec. 2, 2003

(54) WORK STATION SET-UP GAUGE WITH REMOTE READOUT

(76) Inventor: Howard W. Grivna, 12607 - 74$^{th}$ Ave., N., Maple Grove, MN (US) 55369

( * ) Notice: Subject to any disclaimer, the term of this patent is extended or adjusted under 35 U.S.C. 154(b) by 0 days.

(21) Appl. No.: 09/946,370

(22) Filed: Sep. 4, 2001

(51) Int. Cl.$^7$ .................................................. G01B 5/14
(52) U.S. Cl. ............................. 33/832; 33/542; 33/833
(58) Field of Search .......................... 33/832, 783, 784, 33/792, 793, 833, 613, 645, 655, 542, 542.1

(56) References Cited

U.S. PATENT DOCUMENTS

| | | | |
|---|---|---|---|
| 3,939,611 A | | 2/1976 | Hesler et al. |
| 4,238,887 A | * | 12/1980 | McLaughlin ................ 33/822 |
| 4,458,423 A | * | 7/1984 | Sakata et al. ................ 33/832 |
| 4,513,539 A | * | 4/1985 | Steinback .................. 451/300 |
| 4,924,598 A | * | 5/1990 | Gruhler ..................... 33/503 |
| 5,036,596 A | * | 8/1991 | Gyoury et al. ............... 33/558 |
| 5,040,308 A | * | 8/1991 | Meyer ....................... 33/556 |
| 5,125,165 A | * | 6/1992 | Gerhard .................... 33/501.6 |
| 5,373,645 A | * | 12/1994 | Bezinge et al. .............. 33/556 |
| 6,102,781 A | | 8/2000 | Greathouse et al. |
| 6,357,134 B1 | * | 3/2002 | Hama et al. ................. 33/703 |

* cited by examiner

*Primary Examiner*—Diego Gutierrez
*Assistant Examiner*—Amy R. Cohen
(74) *Attorney, Agent, or Firm*—Haugen Law Firm PLLP

(57) ABSTRACT

A gauge assembly for use with surface finishing apparatus having an endless conveyor for transporting workpieces through one or more work stations. The gauge assembly includes a gauge head or body having a planar base support surface housing a movable linear scale shaft having a planar distal upper end surface and mounted for reciprocatory movement between extended and retracted dispositions. A push rod control is provided for accurately controllably positioning the head within the finishing apparatus. A signal generator coupled to the linear scale shaft generates a signal indicative of the position of the distal end surface of the linear scale shaft relative to the planar base support surface, and a remote meter coupled to the signal generator provides a movable and closely positionable meter for visually determining the position of the elevation of the distal end surface and the gauge head.

8 Claims, 4 Drawing Sheets

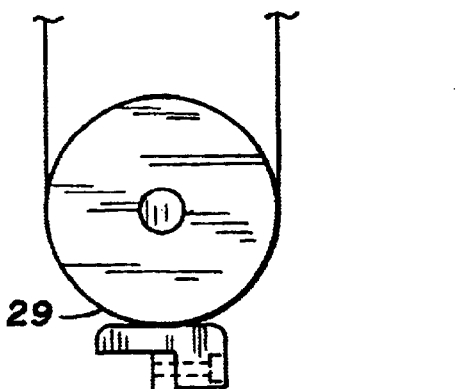
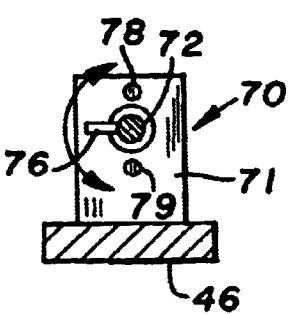
FIG.7
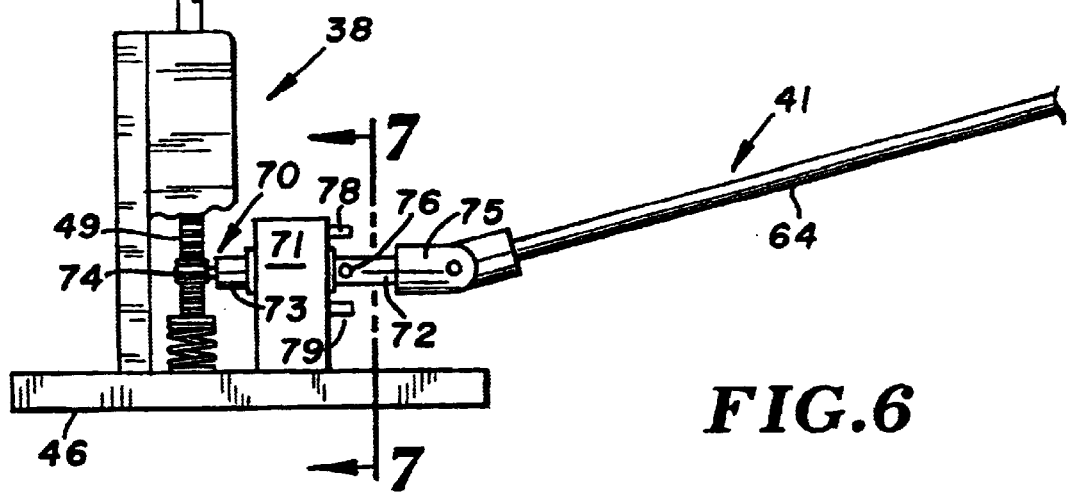
FIG.6
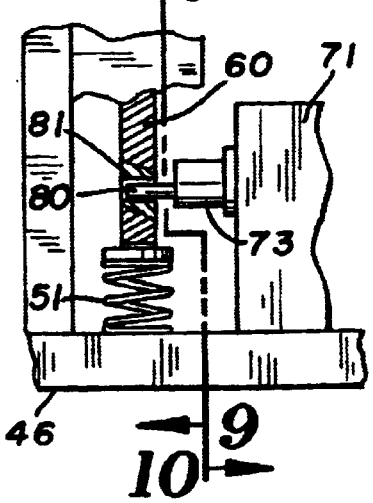
FIG.8
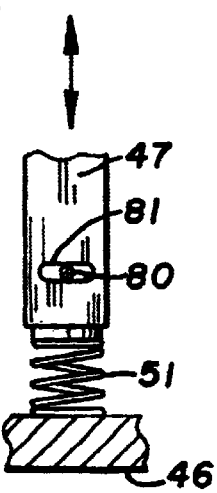
FIG.9
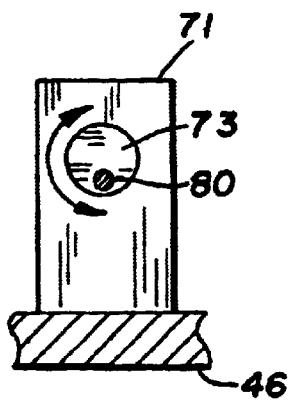
FIG.10

WORK STATION SET-UP GAUGE WITH REMOTE READOUT

BACKGROUND OF THE INVENTION

The present invention relates generally to an improved set-up assist and/or diagnostic gauge device having a remote digital readout, or more particularly to a set-up or diagnostic gauge having a push rod coupled thereto for remotely locating and positioning the measuring head or body portion of the gauge, with the gauge assembly having a readout operably coupled to the gauge but remotely positionable. The apparatus of the present invention is particularly adapted for use in combination with surface finishing apparatus or machines such as sanding, planing, or milling machines which may include an endless conveyor roll feed, or other means of feeding or indexing a workpiece under a work station together with one or more work stations each station being equipped with a workpiece surface treating apparatus for performing an operation on a workpiece supported on a surface. Examples of such apparatus include wide-belt sanders with single or multiple heads or knife planers, as well as such apparatus incorporating wide-belt stations in combination with orbital sander stations, bushing or abrading stations, or knife planer stations. These exemplary systems as well as others are in wide usage throughout industry, and are, of course, well known to those of conventional wisdom in these fields.

In their conventional use and applications, it is necessary to set and/or check the height or thickness settings or adjustments of surface contacting pinch rolls, sanding drums, workpiece holding shoes and the like throughout each of the individual work stations relative to the supporting surface, i.e., the conveyor. In this connection, it is routinely required that the technician set and/or check the side-to-side height adjustments or settings of the working rolls, drums, shoes and the like, in order that workpieces are accurately and uniformly treated as they move through the work station or stations of the machine. As production techniques improve, the demands placed upon performance of these systems increase, and as a result components and/or sub-assemblies must be periodically checked for ascertaining and verifying the positionable setting of the working components.

In addition to those problems inherent in initial set-up of a machine for a given operation, other problems arise from ordinary wear and tear, such as the development of mechanical run-out of the surface contact devices including pinch rolls as well as the higher speed rolls supporting an orbiting wide abrasive belt, Mechanical run-out arises from normal machine usage, as well as from installation of rotating shafts which are out-of-round. Routine maintenance checks are employed to ascertain the existence of such anomalies. By way of example, the surface of a shaft utilized in driving a surface contacting component may, in certain cases, lose its concentricity or become out-of-round due to improper machining or abuse in operation. This, in turn, will create a sinusoidal displacement of the workpiece contact device with this condition manifest in the creation of irregular surfaces on the workpiece. Also, other components such as hold-down shoes or bed plates wear unevenly over time and must also be measured. The apparatus of the present invention facilitates and/or provides an expedient means for determining the accuracy of set-up of surface contacting components, thus reducing machine down-time, while improving machine and technician performance.

In accordance with the present invention, a set-up/diagnostic gauge device and assembly is provided for use in combination with surface finishing apparatus, the finishing apparatus typically having a frame supporting a conveyor means along with one or more work stations positioned in opposed relationship to the top flight of the conveyor means so that the surface testing apparatus performs one or more operations on workpieces traveling through the work station or stations. Gauges of choice presently being used in measuring the spacing in between the workpiece surface contacting means and the conveyor top flight are portable scales having a read head mechanism and internal display. Because the read head and display are combined within a single enclosure, the display typically is an analog or digital device equipped with a magnifying lens to accommodate reading at a distance. Because of the existence of multiple work stations positioned along a single or common conveyor, the readings obtained with the current scales become more and more difficult to accurately ascertain, as distance from the observer increases. The apparatus of the present invention facilitates and simplifies these operations by providing an easily positionable read head with remote readout device.

Therefore, and in accordance with the present invention, the gauge means employs a body, head, or enclosure member with a base planar support surface for direct placement on the surface of the top flight of the typical feed system. The gauge body includes a movable linear scale shaft with a distal upper end surface, with the shaft being mounted for reciprocatory up and down motion within the gauge body enclosure between extended and retracted positions. Scale shaft control means are operably coupled to the gauge body for controllable placement, and for controlling movement of the linear scale shaft between its extended and retracted disposition. As is apparent, the head or body portion of the gauge means is utilized to determine the dimensional separation or height of the workpiece surface contacting means from the workpiece supporting surface, namely the feed system top flight. By way of further explanation, the push rod means is coupled to the body and extends laterally therefrom for controlled placement of the gauge within the machine being attended. Signal generator means are coupled to the linear scale shaft for generating an electrical signal which represents or is otherwise indicative of the vertical position or elevation of the linear scale shaft and its distal end surface relative to the planar base support. Additionally, means responsive to the signal generator are provided in the apparatus of the present invention, with the signal responsive means including a remotely positionable digital meter for visually indicating the position of the linear scale shaft.

Thus, and in accordance with the present invention, an improved set-up/diagnostic gauge device is provided which is particularly adapted for use in combination with surface treatment and/or finishing apparatus, with the gauge facilitating and simplifying the steps necessary to accurately adjust the height or thickness of workpieces surface contacting devices from the workpiece supporting surface. The improved set-up/diagnostic gauge device of the present invention enables the operator and/or technician to quickly and readily place the gauging or measuring component in proper disposition for obtaining accurate and easily read measurements within the surfacing machine being attended.

Therefore, it is the primary object of the present invention to provide an improved set-up/diagnostic gauge for use in combination with surface treating and/or finishing apparatus, with the device being equipped with a remote digital readout which is physically removed and separate from and independent of the gauge head or body.

It is yet a further object of the present invention to provide an improved set-up/diagnostic gauge device for use in combination with surface treating and/or finishing apparatus, with the gauge component being equipped with hand control push rod which permits ease of placement or positioning of the gauge component for accurate adjustment of workpiece surface contacting means relative to an opposed feeding or indexing system.

It is yet a further object of the present invention to provide an improved set-up/diagnostic gauge device with a remote readout, with the gauge head or body component designed for use in set-up and adjustment of conveyor-fed or indexed surface treatment apparatus having multiple work stations positioned along the upper surface of the conveying means top flight.

Other and further objects of the present invention will become apparent to those skilled in the art upon a study of the following specification, dependent claims and accompanying drawings.

BRIEF DESCRIPTION OF THE DRAWINGS

FIG. 6 is a view similar to FIG. 3 and illustrating an alternative means for articulating the linear shaft scale with the gauge head or body of the present invention in place;

FIG. 7 is an end view taken along the line and in the direction of the arrows 7—7 of FIG. 6 and illustrating the detail of one scale shaft drive mechanism;

FIG. 8 is a detail side elevational view, partially in section, and on a slightly enlarged scale, illustrating a detail of the embodiment illustrated in FIGS. 6 and 7; and FIGS. 9 and 10 are vertical sectional views taken along the line and in the direction of the arrows 9—9 and 10—10 respectively of FIG. 8.

DETAILED DESCRIPTION OF THE PREFERRED EMBODIMENT

Figure 1:
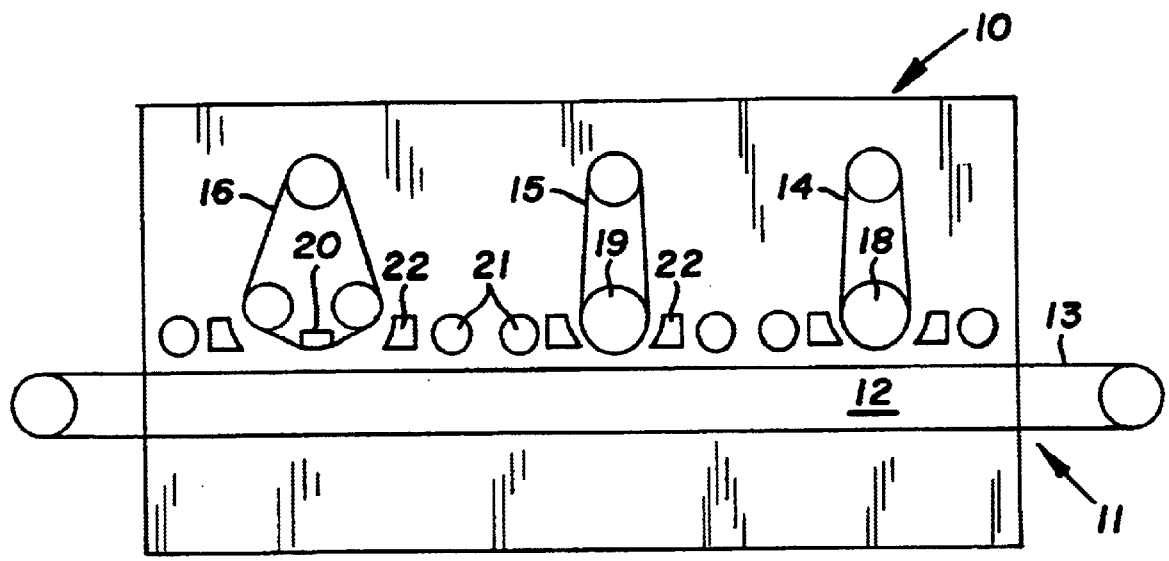
FIG. 1 is a side elevational view of a typical wide-belt sander apparatus of the prior art having an endless conveyor with a top flight arranged to carry workpieces along and through a plurality of individual work stations with a side frame panels and shrouds of the apparatus removed so as to expose the individual working heads.

In accordance with the preferred embodiment of the present invention, a typical multi-station or multi-head wide-belt sander is illustrated, with the system apparatus shown generally at 10 comprising a frame with a conveyor generally at 11, conveyor including a feed bed 12 incorporating a conventional endless belt 13. Multiple work stations are shown as at 14, 15, and 16 with stations 14 and 15 being typical wide-belt sanders with surface treating or finishing heads 18 and 19. The apparatus illustrated at 16 includes a platen head wide-belt, having a platen 20 positioned adjacent the belt. Typical pinch rolls are provided as at 21—21, along with workpiece hold-down shoes 22—22. Apparatus and systems of the type shown at 10 are known in the prior art.

Figure 2:
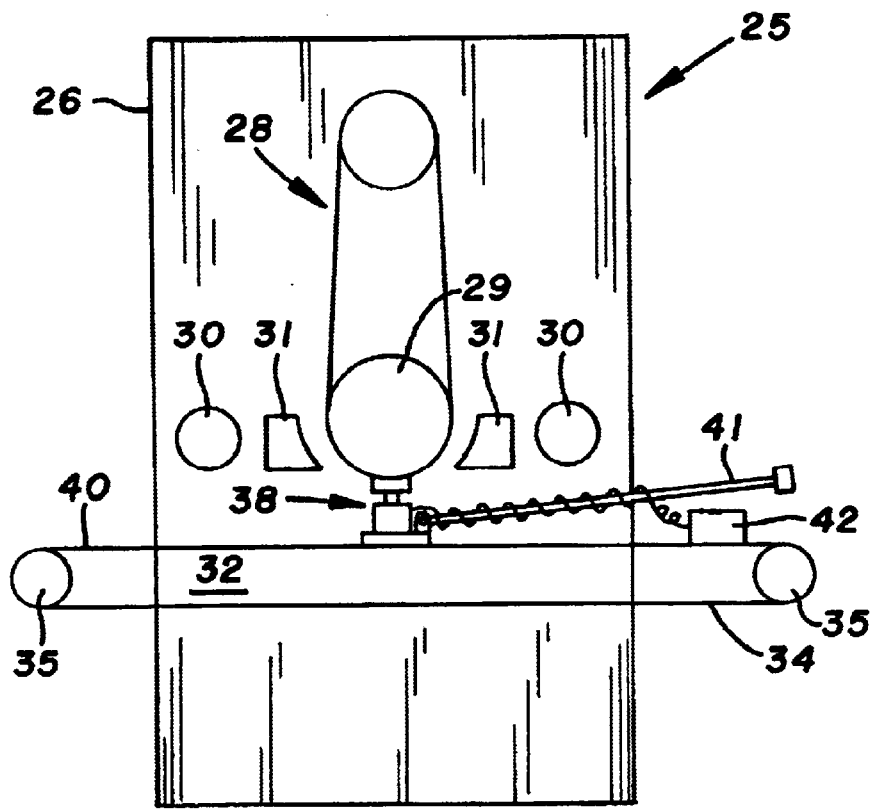
FIG. 2 is a side elevational view similar to FIG. 1 of a typical wide-belt sander apparatus having a single sanding head with pinch rolls and hold down shoes disposed on opposite sides of the contact drum and with the improved set-up/diagnostic gauge means of the present invention in place between the conveyor surface and the surface of the contact drum, and with the remote readout being positioned on the infeed side of the conveyor feed bed.

With attention being directed to FIG. 2, surface treating and/or finishing apparatus generally designated 25 includes a frame 26 supporting a work station shown generally at 28. Work station 28 includes a wide-belt sander with contact roll or drum 29 along with pinch rolls 30—30 and workpiece contacting shoes 31—31. Conveyor system generally designated 32 includes a feed bed supporting a conveyor belt as at 34, driven and tensioned by rolls 35—35. In addition, a set-up/diagnostic gauging device in accordance with the present invention is illustrated generally at 38, with the gauge device designed to determine the adjustable separation between the top flight or work supporting surface 40 of conveyor 32 and the workpiece surface contacting zone of contact drum 29. The set-up/diagnostic gauge device is also shown with its elongated push rod member 41 and remote readout device 42 in place.

Figure 3:
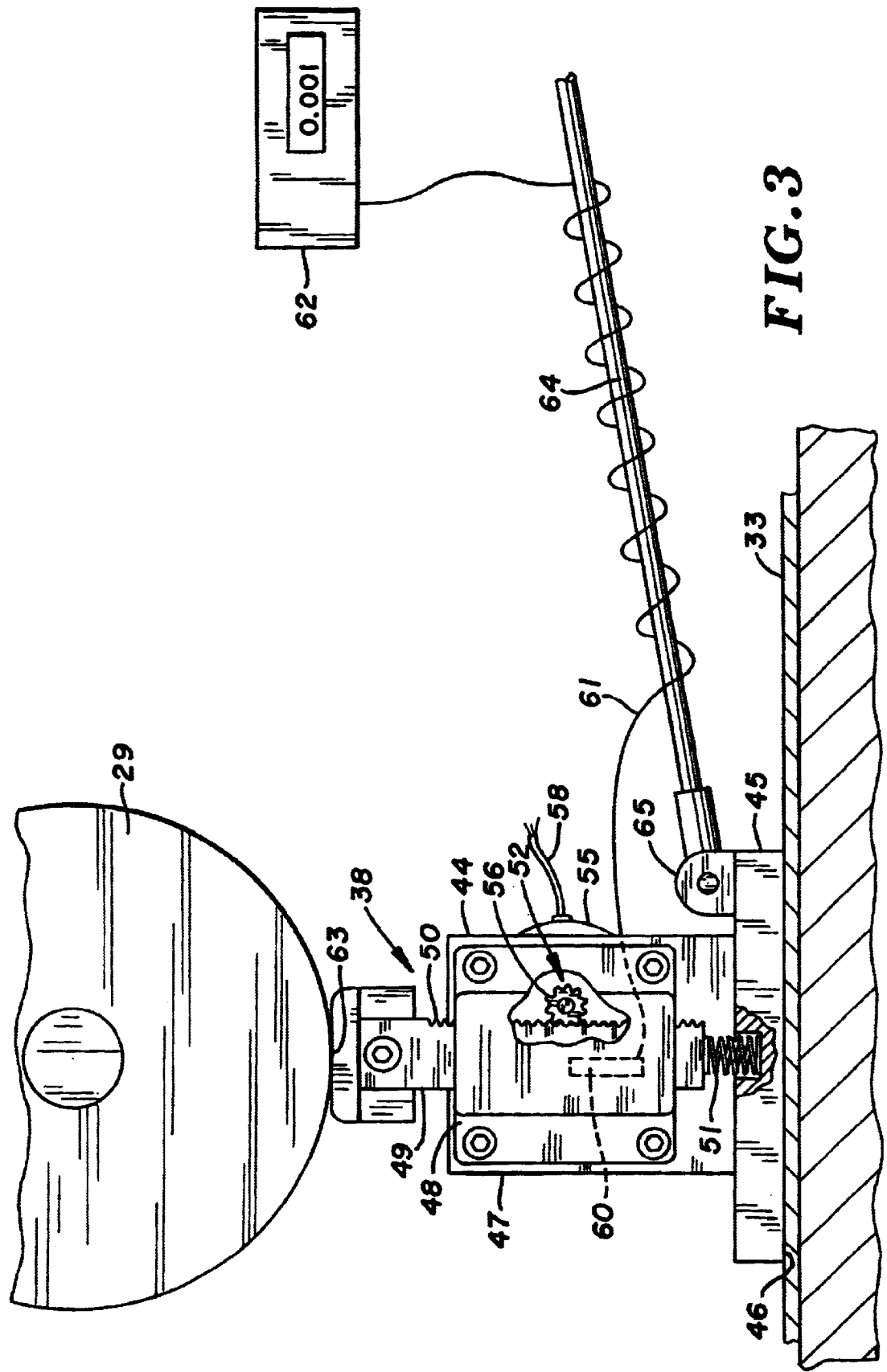
FIG. 3 is a side elevational view, partially in section, and illustrating on a slightly enlarged scale, the gauge body in operative disposition with a contact drum, along with the remote readout, and with portions of the gauge body being shown cut-away.
Figure 4:
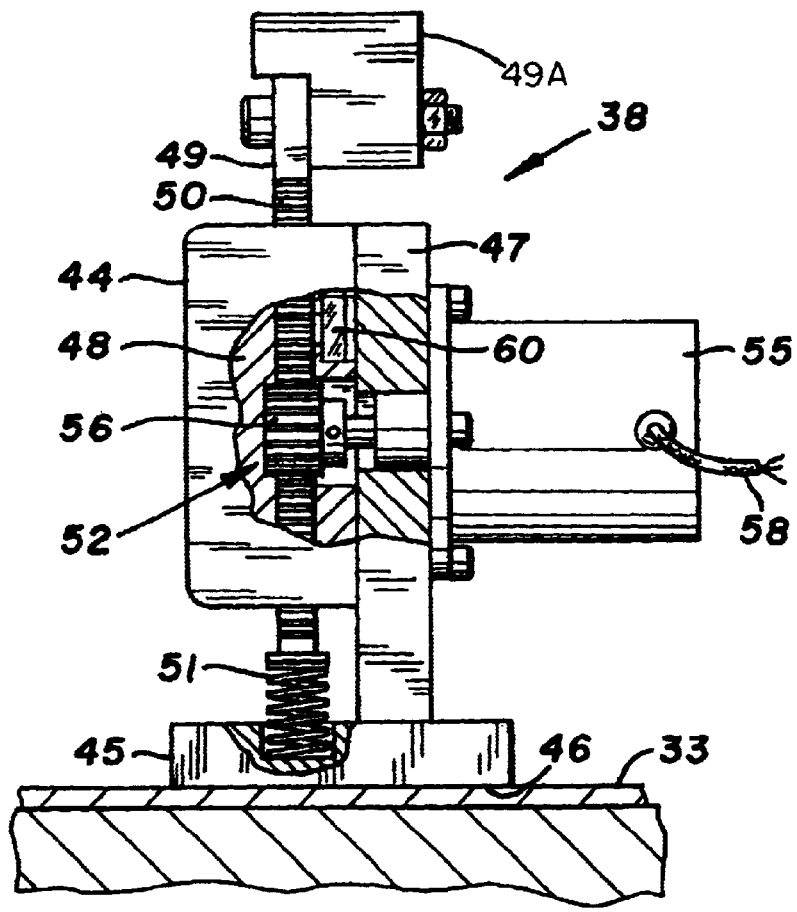
FIG. 4 is a detail elevational view, partially cut-away and in section of the gauge head or body, and showing the body on a conveyor belt, with portions of the belt and supporting conveyor bed being shown in section.
Figure 5:
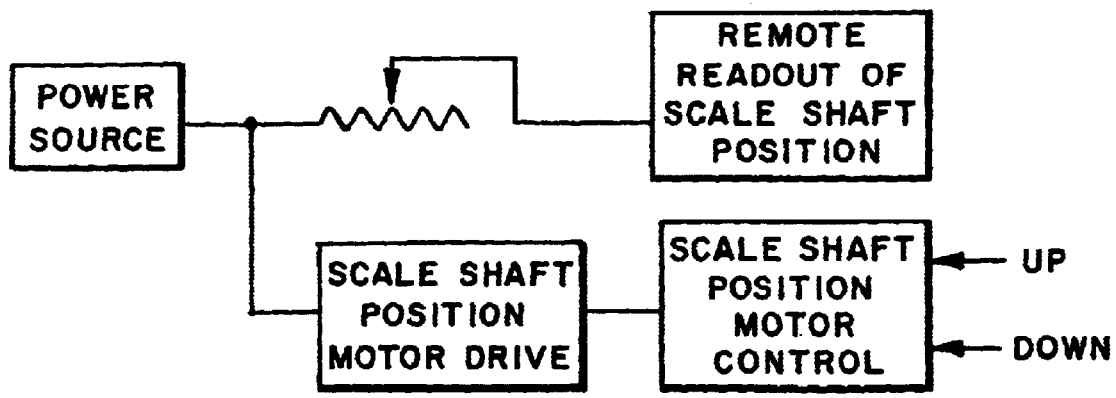
FIG. 5 is a schematic block diagram illustrating one arrangement of operational components, including power source and various circuitry elements used in a typical set-up of gauging apparatus fabricated in accordance with the present invention.

With attention now being directed to FIGS. 3 and 4 of the drawings, set-up/diagnostic gauge 38 includes a gauge head or body 44 mounted upon a planar base support 45 having a lower support surface 46. Gauge body further includes a housing or enclosure 47 comprising wall members extending upwardly from base support 45 defining an enclosure as at 48. Movable linear scale shaft 49 includes a terminal contact head 49A, and further comprises a rack surface as at 50 is mounted for reciprocal up-and-down motion within body or enclosure 44, with this motion being, of course, along a vertical gauging path. Scale shaft 49 and terminal contact head 49A are designed to move between extended and retracted dispositions, with terminal contact head 49A being arranged to contact the surface of contact drum 29 as illustrated in FIG. 3. A mechanical bias is provided by spring 51 arranged coaxially with the lower portion of shaft 49. Spring 51 eliminates any inaccuracy or inconsistency created due to back-lash during reading. One alternative position control means shown generally at 52 is provided for controllably positioning said linear scale shaft along its vertical gauging path, with the position control means including a drive motor 55 and drive pinion 56. Motor 55 may be a stepper motor. Drive pinion 56 is in mesh with rack 50, thereby providing for linear drive motion of scale shaft 49 between its extended and retracted dispositions. Motor lead 58 is provided to controllably step or move pinion 56 for up and down motion of shaft 49.

Signal generator means are provided at 60, with generator means 60 being coupled to the linear scale shaft 49 for generating a signal indicative of the position of scale shaft 49 relative to base support surface 46. Distal or end surface 63 of scale shaft 49 is, of course, planar, with the plane being parallel to the plane of base support surface 46. For convenience, signal generator means may be in the form of a linear potentiometer combined with a wiper or movable contact element secured to and linearly movable with scale shaft 49.

With continued attention being directed to FIG. 3, flexible electrical lead 61 is electrically coupled to remote readout 62. Remote readout 62 is preferably a digital readout and provided with means responsive to the signal generator or linear potentiometer 60, thereby providing a visual indication of the position of surface 63 relative to support surface 46. When desired, readout meter 62 may be equipped with a "zero" feature which will provide a visual indication of travel motion of scale 47 relative to a previously ascertained "zero" position. The utilization of a "zero" position function is particularly useful in leveling a contact drum for wide-belt sanders, as well as for use with sanders having multiple work stations.

With continued attention being directed to FIG. 3 of the drawings, push rod 64 is provided, with push rod 64 being coupled to gauge 38 through pivotal link 65. This arrangement permits and facilitates controllable movement and placement of gauge body 38 along the surface of conveyor belt 40 and into desired working position relative to workpiece surface contacting member such as contact drum 29.

With attention now being directed to FIGS. 6 and 7 of the drawings, an alternative position control means is shown to provide motion for controllably positioning linear scale shaft 49 along its vertical gauging path. This. alternative means, shown generally at 70 comprises a gear box as at 71 with an input shaft 72 and an output shaft 73. Output shaft 73 includes a pinion as at 74 in mesh with rack 50. Rotational motion is delivered to input shaft 72 by means of coupler head 75 driven by push rod 64. Coupler head 75 may be coupled to rod 64 through a universal joint, or more preferably through a roll pin shown at 76 (FIG. 6). In this fashion, rotation of push rod or shaft 64 will deliver rotational motion to input shaft 72 with roll pin 76 providing the drive coupling. If desired, additional roll pins as at 78 and 79 may be employed to control the extent of rotational motion of shaft 64.

As a still further alternative, the distal tip of output shaft 73 may be equipped with an eccentrically positioned roll pin 80 positioned to engage in a bore or slot 81 formed in scale shaft 47, thereby delivering linear motion to scale shaft 47 for actuating transducer or signal generator such as the potentiometer and wiper combination (see FIGS. 8, 9 and 10).

Thus, in accordance with the present invention, a set-up/diagnostic gauging device is provided which permits and facilitates accurate determination of workpiece contacting surfaces relevant to the supporting system, with the device incorporating a remote digital readout for operator convenience and accuracy.

It will be appreciated that the specific embodiments disclosed herein are provided for purposes of illustration only, and are not to be otherwise construed as a limitation upon the scope to which the present invention is entitled.

What is claimed is:

1. In combination with a surface finishing apparatus having frame means supporting a work station having a workpiece surface treating apparatus with one or more distinct workpiece surface contacting means, conveyor system mounted on said frame means with a top flight feeding or indexing workpieces to said surface treating apparatus and for transporting workpieces through said work station; portable gauge means for determining the separation between said workpiece surface contacting means and said feeding system top flight, said gauge means comprising:

(a) a self-contained, portable gauge body having a planar base support surface with walls extending upwardly therefrom defining an enclosure;
   (b) a movable linear scale shaft having a distal end surface and mounted for reciprocatory up-and-down motion within said enclosure along a vertical gauging path between extended and retracted dispositions, and with position control means being operatively coupled to said scale shaft for controllably positioning said linear scale shaft between said extended and retracted dispositions;
   (c) an elongated push rod operatively coupled to the front of said gauge body and extending laterally therefrom for remotely and laterally positioning said gauge body at selected distinct locations along the base support plane of said top flight and between said one or more workpiece surface contacting means and said top flight for operably determining the vertical separation therebetween;
   (d) signal generator means coupled to said linear scale shaft for generating a signal indicative of the position of said linear scale shaft distal end surface relative to said planar base support surface while said gauge body is being supported on the planar base support surface of said top flight; and
   (e) means responsive to said signal means including a remotely positionable meter for visually indicating the position of said distal end surface along said gauging path with said remotely positionable meter being operatively disposed and positionably removed from said work station.

2. The combination of claim 1 wherein said signal responsive means includes a remotely positionable readout.

3. The combination of claim 2 wherein said remotely positionable readout is a digital meter operatively coupled to said gauge body with flexible electrical conductors.

4. The combination of claim 1 wherein said remotely positionable readout includes a means for zeroing a certain randomly pre-selected position of said linear scale shaft along said gauging path between said extended and retracted dispositions.

5. The combination of claim 1 wherein said position control means includes a drive mechanism for controllably moving said linear scale shaft along said gauging path between said extended and retracted dispositions.

6. The combination of claim 1 wherein the distal end of said movable scale shaft comprises an engagement head with a planar top surface lying in a plane parallel to the plane of said base support surface.

7. The combination of claim 1 wherein said position control means comprises a spring bias means normally urging said linear scale shaft toward extended disposition.

8. The combination of claim 1 wherein said position control means comprises a rack and pinion drive.

* * * * *